United States Patent [19]

Hu et al.

[11] Patent Number: 4,615,029
[45] Date of Patent: Sep. 30, 1986

[54] RING TRANSMISSION NETWORK FOR INTERFACING CONTROL FUNCTIONS BETWEEN MASTER AND SLAVE DEVICES

[75] Inventors: Kwok D. Hu; Robert W. Bloemer, both of Dallas, Tex.

[73] Assignee: Texas Instruments Incorporated, Dallas, Tex.

[21] Appl. No.: 677,153

[22] Filed: Dec. 3, 1984

[51] Int. Cl.⁴ .............................................. H04J 3/24
[52] U.S. Cl. .................................. 370/89; 340/825.05
[58] Field of Search .............................. 370/89, 90, 86; 340/825.05

[56] References Cited

U.S. PATENT DOCUMENTS

3,787,627  1/1974  Abramson et al. ................... 370/90
4,383,314  5/1983  Tam ....................... 370/86

*Primary Examiner*—Douglas W. Olms
*Attorney, Agent, or Firm*—Kenneth C. Hill; James T. Comfort; Melvin Sharp

[57] ABSTRACT

A ring network is comprised of slave devices (96) (98), (100) and (102) that are interconnected on a ring network. The slave device (96) is interfaced with a test-/maintenance controller (120) through a serial transmission line (106). The slave device (96) is interfaced with the slave device (98) through a serial transmission line (108). The slave device (98) is interfaced with the slave device (100) through a line (110) and the slave device (102) is interfaced with the slave device (100) through a line (112) with the slave device (102) being interfaced with the controller (120) through a line (114). A clock is generated by the controller (120) and transmitted to each of the slave devices through a node (1188) to provide an asynchronous clock with respect thereto. Each of the slave devices has an internal synchronizing circuit (130) for synchronizing the internal operation of the devices with respect to the controller (120). In addition, a data line select circuit (121) is provided to determine direction of transmission on the bus. The controller selects the position of the devices on the bus by transmitting a unique identifier which is recognized by a slave device as a select signal therefor as a function of its relative position on the bus with respect to the point from which the data was transmitted. The controller (120) can transmit from either direction on the bus and receive data from either direction.

18 Claims, 10 Drawing Figures

FIG. 10

RING TRANSMISSION NETWORK FOR INTERFACING CONTROL FUNCTIONS BETWEEN MASTER AND SLAVE DEVICES

TECHNICAL FIELD OF THE INVENTION

The present invention pertains in particular to ring networks and, more particularly, to a ring network utilized to provide control functions for a plurality of slave devices in a network.

CROSS REFERENCE TO RELATED APPLICATION

This patent is related to patent application Ser. No. 673,247, titled VERY LARGE SCALE INTEGRATED CIRCUIT WITH INTEGRAL SELF-TEST CAPABILITY, filed Nov. 20, 1984.

BACKGROUND OF THE INVENTION

As the demands of technology have increased, both the density and the multiplicity of functions performed by a given integrated circuit have increased. In addition, the speed at which data is processed through these integrated circuits has also increased. These devices are generally referred to as Very Large Scale Integrated Circuits (VLSI). To reliably realize VLSI devices, new techniques have been developed to both fabricate the device at the semiconductor chip level and also to package the chip. There are some inherent disadvantages to this increased density and speed since the VLSI devices must still be interfaced with peripheral circuits and thus must have some output ports, control ports, etc. Due to the large number of functions that are performed by a given VLSI chip, the number of interface connections or IC pins is relatively low as compared to the number of functions that the device performs. The result is that the internal functions are relatively inaccessible for troubleshooting and failure analysis, since use of interface connections must be optimized and they are generally dedicated to the functional modes of the device rather than testing modes.

Once a system is manufactured utilizing VLSI circuits, it is important to maintain some form of built-in test for both the VLSI chip and the system in which it is incorporated. This test can be performed at many levels such as the chip level, the board level, and the system level with the chip level being the lowest level. The purpose of the built-in test is to determine if the system meets operating specifications prior to performing a desired function. Failures can be in the form of defective interconnects between connectors and the various components, defective interconnects between VLSI chips on a given circuit board, or even defective interconnects between the pins of the VLSI chip and the board itself. At the chip level, failures can be of two types, a defect in the functional portion of the chip or the interface circuits between the functional portion of the chip and the IC pins. A large percentage of chip failures are due to defects in the output interface circuits. At the board level, failures are either due to bad interconnects on the PC board or faulty contact of the IC pins with the interconnect pattern on the board. System level defects are normally in the form of faulty connections between control and signal buses.

In performing a system test, prior art systems have utilized a central processor or similar peripheral device which generates various test patterns for input to each of the devices in the system. The functions of each of the devices are also controlled such that each device can be independently tested or, alternately, the various circuits on the various boards controlled to interact in a predetermined manner and output a predetermined signal. This output signal for either type of test is compared with an expected result and a determination made as to whether the results are in the acceptable operating range. If the results are not within the acceptable range, the system is classified as a failure and it must be either repaired or replaced.

To perform built-in tests on a system at either the system level, the board level or the chip level, it is desirable to have each of the various levels perform a self-test in response to a single prompt signal. This self-testing requires built-in test circuits that are different from the normal functional circuitry. These test circuits generate test signals, process output signals and control the general test itself. Present systems for providing built-in testing of individual components require dedicated pins on the IC for allowing access to the functional portions of the IC. This is a disadvantage in that a large number of dedicated pins may be required. Dedication of an IC pin to a test feature is undesirable and should be minimized whenever possible In view of the above disadvantages, there exists a need for self-testing VLSI circuits that do not require the use of a large number of dedicated IC pins to interface with the VLSI circuit in the test mode.

SUMMARY OF THE INVENTION

The present invention disclosed and claimed herein comprises a communication network which includes a common transmission line with two ends connected to a master control unit to form a ring. The master control unit originates transmission in either end of the transmission line and receives transmission from either end thereof. A plurality of a slave devices are disposed about the ring at predetermined positions relative to each other and in series with the transmission line. Each of the slave devices determines the direction of the transmission on the ring and delays this transmission for a predetermined delay time. The data is monitored during this delay time in order to detect a unique identifier in the transmission. This unique identifier is generated by the master control unit and corresponds to the relative position of the receiving one of the slave devices on the ring. When the unique identifier is recognized by a slave device, transmission is inhibited and the recognizing slave device terminates the ring at that position such that communication with slave devices at higher positions on the ring is inhibited. This termination is maintained until another unique identifier is transmitted having a position higher than the selected one.

The unique identifier is comprised of a count value encoded in a serial transmission format, the transmission line being a serial transmission line. Each of the slave devices modifies the count value by one if the count value is greater than zero. If the count value is equal to zero, this constitutes an identifier and the slave device terminates the transmission. Each of the slave device modifies the count by one and then relays it to the next adjacent slave device. The count value is equal to n-1 for selecting the nth slave device on the ring. The count is relative to the end of the ring from which the identifier was transmitted.

In another embodiment of the present invention, the master control unit generates an independent clock which is asynchronous which is relative to the operation of each of the slave devices. Each of the slave devices includes a synchronizing circuit for synchronizing the functional operation of the slave device relative to transmission of data on the ring.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Self Test Circuit

Figure 1:
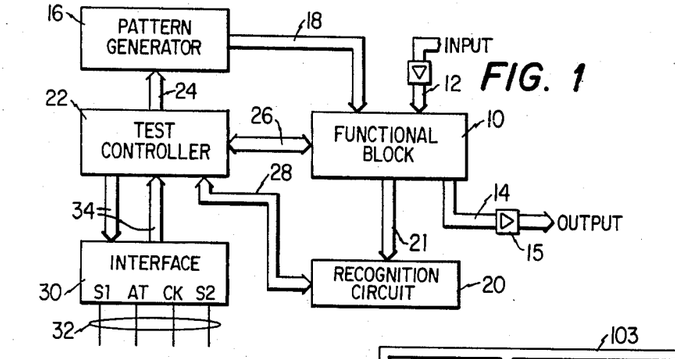
FIG. 1 illustrates a schematic block diagram of the functional circuit and associated test circuitry on self-testing a VLSI chip.

Referring now to FIG. 1, there is illustrated a schematic block diagram of a Very Large Scale Integrated Circuit (VLSI) which consists primarily of a functional circuit block 10. The functional circuit block 10 may perform any type of function such as that of an arithmetic logic unit (ALU), a multiplier, an adder, etc. In the preferred embodiment, the functional circuit block 10 is a digital circuit which processes digital data. However, it should be understood that the functional circuit block 10 can be analog.

The functional circuit block 10 receives input data on an input bus 12 and outputs data on an output bus 14. The input bus 12 and output bus 14 are representative of a group of lines that are interfaced through an input buffer 13 and an output buffer 15 with pins of the IC package. The buffers 13 and 15 are tri-state buffers which are controllable to completely disconnect the functional circuit block 10 from the IC pins, and thus from interfacing with peripheral devices.

The functional circuit block 10, as described above, has a functional mode and, in addition, it also has a test mode. In the test mode, test signals are generated in accordance with a predetermined program and the result of processing these test signals with the functional circuit 10 is analyzed. The test signals are generated in a pattern generator 16 which is connected to the input of the functional circuit block 10 through a bus 18. A recognition circuit 20 is connected to the output of the functional circuit block 10 through a bus 21 to receive the processed test signals and compare them with predetermined test criteria. The generation of test signals by the pattern generator 16 and the operation of the functional circuit block 10 in the test mode is controlled by a test controller 22 which is interfaced with the test pattern generator or ROM 16 through a bus 24, the functional circuit block 10 through a control bus 26 and with the recognition circuit through a bus 28 for providing test criteria data.

The test controller 22 is operable to run a predetermined test program which is stored internally to the VLSI device to determine the function of the functional circuit block 10 and also the test signals that are input thereto. The test controller also determines the predetermined test criteria for input to the comparator or recognition circuit 20. One example of a functional circuit and the test program therefor is an AND gate wherein the test program is comprised of the truth table. The logic states on the input are varied by the test pattern generator 16 and the output compared with the expected results of either a logic state of "0" or a logic state of "138 . These expected results are generated by the test controller 22 with the recognition circuit being comprised of a two input comparator.

An interface circuit 30 is provided for interfacing between the test controller 22 and a control bus 32. The interface circuit provides a dedicated port to the control bus 32 through which to control the operation of the functional block 10 in a test/maintenance mode, as will be described hereinbelow. The control bus 32 carries control signals to the VLSI device and also carries test results away from the VLSI device to an external point and is comprised of two signal lines S1 and S2, an error information line AT and a clock line CK, the operation of which will be described hereinbelow.

Self Test Operational Mode

In operation, the functional block 10 is normally in the functional mode which allows the device to receive signals on the input bus 12 and output signals on the output bus 14 and operate in the system. These buses 12 and 14 interface through the buffers 13 and 15, respectively, with dedicated IC pins that are integral with the IC package. In the test/maintenance mode, signals are supplied to the interface circuit 30 through the interface control bus 32 to initiate a test sequence. This test sequence is effected with the test controller 22. The test controller 22 first controls the buffers 13 and 15 to prevent the functional circuit 10 from interfacing with external devices and then generates signals through the bus 24 which initiate the generation of a pattern from the test pattern generator 16. In addition, the function circuit block 10, for a muti-task functional block, is controlled by the test controller 22 through the control bus 26 to perform a given function. Depending upon the type of functional circuit block 10 that is utilized, the output will vary and also the number of required tests will vary.

In performing the test, the stored test program is executed by the test controller 22 and a test sequence stepped through. For each test in the sequence, a test input is generated and the function of the functional circuit block set 10 to a selected function. This output is compared with an expected result that is generated by the test controller 22. For each step in the test sequence, a valid comparison or test result can be stored for each test in the sequence. However, since the self-test feature of the present invention is a go/no-go test, it is only necessary to monitor the presence of an invalid test result since this by itself will render the device defective.

By utilizing a self-contained test pattern generator, controller and recognition circuit in conjunction with the functional circuit to be tested and integrating this into a single chip or integral unit, the necessity of applying various external control signals is eliminated. In this manner, it is only necessary to provide initialization signals to the test controller to begin a predetermined test program that is associated with the given VLSI circuit. Therefore, regardless of the density and number of functions performed by the functional circuit block 10, only a minimum number of lines is required to initialize the test procedure and obtain an output therefrom. This allows failure testing at the chip level, which is the lowest level in the hierarchical structure of any system. Since no repairs can be effected on a semiconductor chip, it must be replaced and, therefore, the self-testing feature of the present invention allows an external system controller to request each VLSI device in the system to perform a self-test and relay information back to the system controller that a failure has occurred in the system. It is only necessary to indicate a failure somewhere in the system and not the location of the failure. As will be described hereunder, this is determined in the "maintenance" mode.

Vector Arithmetic Logic Unit

Figures 2, 4:
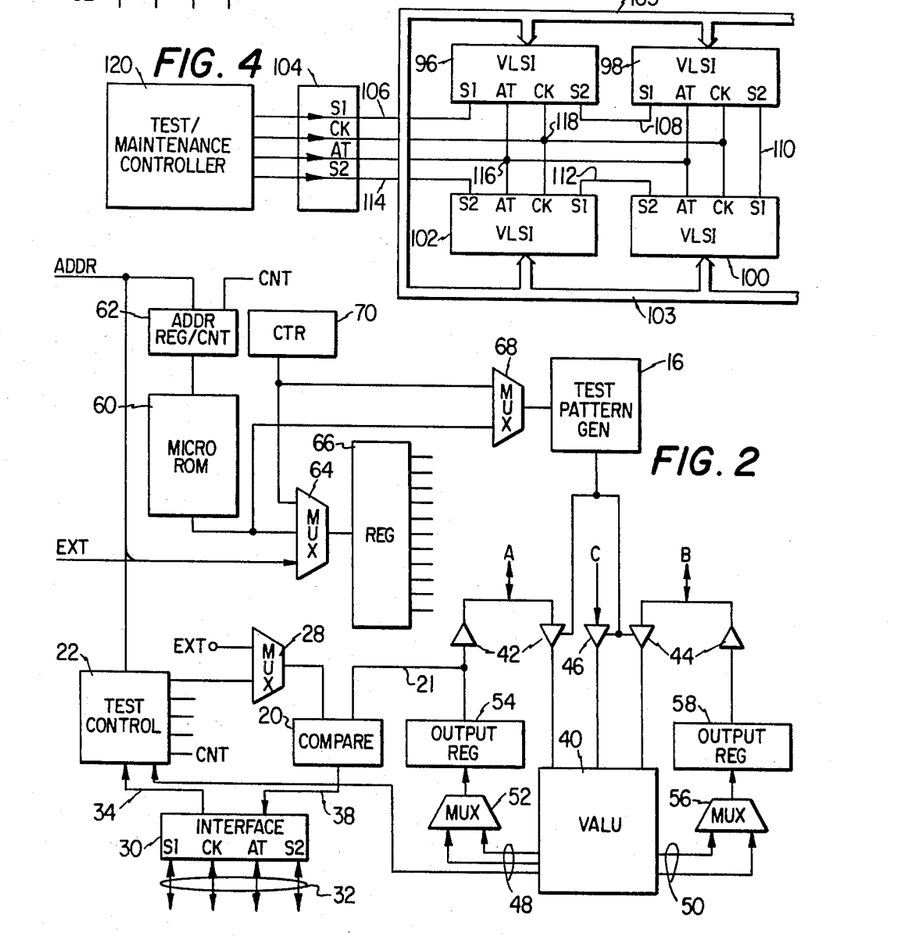
FIG. 2 illustrates an expanded block diagram of the VLSI chip of FIG. 1.
FIG. 4 illustrates a network of VLSI devices connected in a ring configuration.

Referring now to FIG. 2, there is illustrated an expanded block diagram of the self-test circuit of FIG. 1, wherein like parts refer to like numerals in the various figures. The functional circuit block 10, as described above, can be any type of functional circuit. For illustrative purposes, an arithmetic logic unit combined with a number of other functions and referred to as a Vector Arithmetic Logic Unit (VALU) is utilized to describe one embodiment of the present invention. The VALU is denoted by a reference numeral 40 and has three input-/output ports labeled "A", "B" and "C". The A-port has associated therewith a set of bidirectional line drivers 42, the B-port has associated therewith a set of bidirectional line drivers 44 and the C-port is input to one line driver 46 for input of data to the VALU 40. The drivers 42, 44 and 46 represent the input buffer 13 and the output buffer 15 and are controlled by the test controller 22 to allow transfer of data to/from the associated port. The output of the pattern generator 16 is "injected" into the input one of the buffers 42 and one of the buffers 44 and into the buffer 46.

The VALU 40 has two sets of output lines 48 and 50. The output lines 48 are input to a multiplexer 52 which has the output thereof connected to an output register 54 for storing output data. The output lines 50 are input to a multiplexer 56, the output of which is connected to an output register 58 for storage of data therein. The output register 54 outputs data to the A-port through the output of one of the line drivers 42 and the output register 58 outputs data to the B port through the output of one of the line drivers 44.

The functional operations of the VALU 40 are contained in a microcode Read Only Memory (ROM) 60, which is addressed by an external address which is stored in an address register/counter 62. The external address allows a specific function of the VALU 40 to be selected when the circuit is in the functional mode. The output of the microcode ROM 60 is input to one input of the multiplexer 64, the output of which is connected to a pipe line register 66. The output of the pipe line register 66 provides the microcode instructions that control the various functions of the circuit. In operation, the microcode ROM is addressed by a specific address and the data word contained at that location defines what the microcode instructions are on the output of the pipe line register 66. The various gates and reference voltages in the VALU circuit 40 are then set to perform the appropriate function.

Valu Self Test Mode

To facilitate the test mode, as described above with reference to FIG. 1, the test controller 22 outputs control signals to control the output of data from the microcode ROM 60. This is facilitated by outputting a count signal (CNT) to the address register/counter. This CNT signal steps through a sequence of instructions which define the microcode instructions output by the pipe line register 66. The output of the microcode ROM 60 is also input to the test pattern generator 16 which is a Read Only Memory (ROM), the data output by the microcode ROM 60 being addresses therefor. The address input to the test pattern generator 16 is controlled by a multiplexer 68 which has one input thereof connected to the output of the microcode ROM 60 and the other input thereof connected to the output of a counter 70. The counter 70 is controlled by the test controller 22 to load an initial value therein and step through this value at a predetermined clock rate. This value is input to the test pattern generator 16 to provide a predetermined test pattern or sequence of test patterns. Additionally, the output of the counter 70 is also input to one input of the multiplexer 64 to provide a value for output from the pipe line register 66 that can be sequenced through or counted. By loading a predetermined value in the counter 70 with the test controller 22, a series of functions can be stepped through without requiring an individual code for each function in the sequence to be stored in the microcode ROM 60. The counter 70 therefore provides for more efficient use of space on the chip.

In addition to sequencing through the instruction codes in a predetermined manner, a separate diagnostic program can be stored in the microcode ROM 60 which can be executed by sequencing through the individual program steps. Each of the program steps is an address for a microcode instruction. However, this type of test mode requires a large amount of memory space for complex functional circuits.

In an alternate embodiment of the present invention, the register 66 is replaced by the test controller 22 for independent generation of microcode instructions. In this embodiment, the instructions and the program are stored separate from the functional portions of the circuit. From a practical standpoint, the self-test mode is a combination of the above methods.

Error Recognition

In the test mode, the output value is extracted from the output register 54 for input to the recognition circuit or comparator 20. The recognition circuit can be any type of circuit that compares the output value with expected results defined according to predetermined test criteria. One form of this can be a simple comparator circuit. The comparator circuit has one input thereof connected to the output value and the other input connected to the test controller 22. The test controller 22 then outputs a comparison word to the recognition circuit 20 and a direct comparison is made. If a true comparison results, the test has been successful.

However, for a defective circuit, the output of the comparator will indicate a chip defect. This error signal is input to the test controller 22 and then to the interface circuit 30 for output therefrom. The use of this error signal will be described hereinbelow.

In the preferred embodiment, the recognition circuit 20 utilizes conventional data compression techniques to compress the data in either time or space. The expected result which the compressed data output is compared to is a predetermined or "hard wired" result which is the same for all tests. By properly selecting the input data, the ouput can be controlled to be identical with the preset expected results. The data compression techniques utilized in the present invention is Signature Analysis, one example of which is a Check Sum circuit. Signature Analysis techniques are more fully discussed in "Analysis and Assimilation of Parallel Signature Analysis", International Test Conference, 1982 Proceedings, T. Sirdhar, D. S. Ho, P. T. Powell, S. M. Thatte, pp. 656–661.

Figure 3:
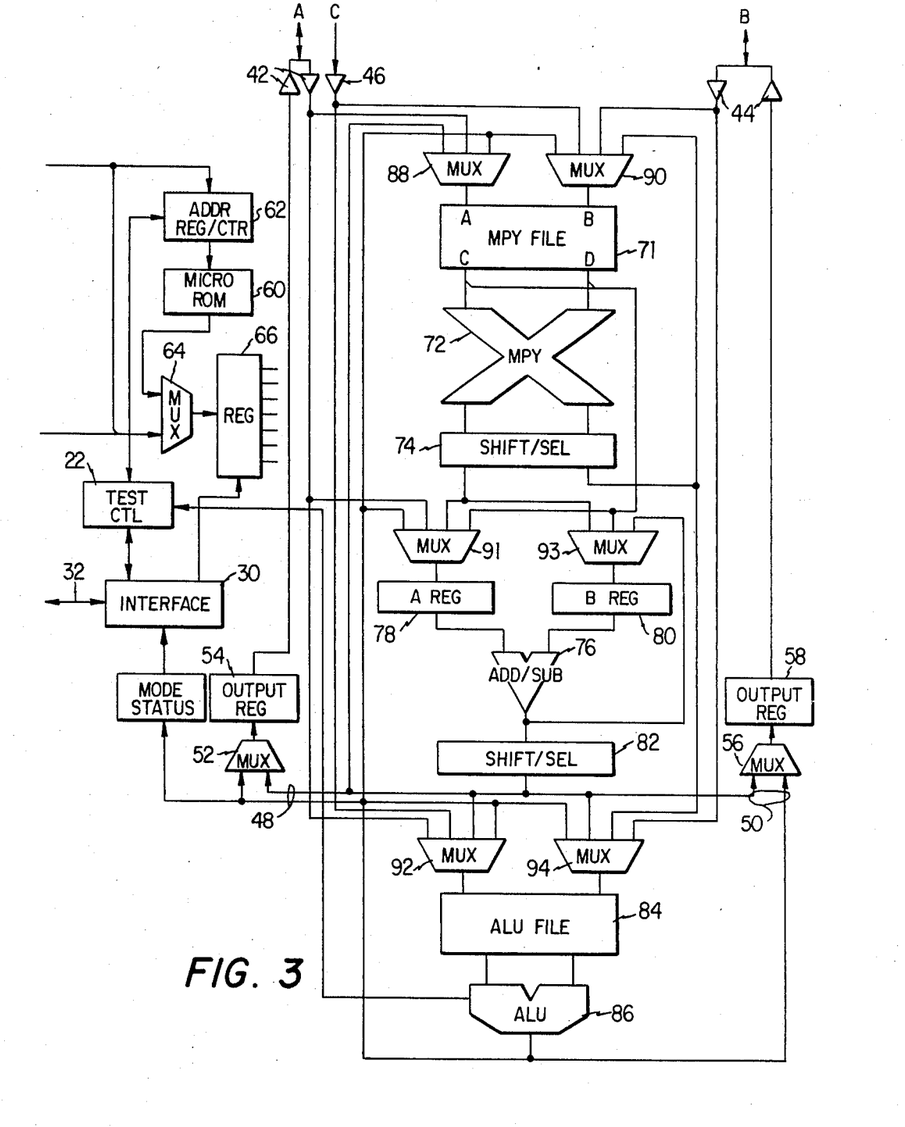
FIG. 3 illustrates a schematic block diagram of the functional circuit of FIG. 2.

Referring now to FIG. 3, there is illustrated an expanded schematic block diagram of the VALU 40 showing some of the functional circuits therein. Some of the functions performed by the VALU 40 are those of an arithmetic logic unit (ALU), a multiplier section and an adder/subtractor section. Each of the sections is individually interfaced with the inputs and outputs and has various files and registers associated therewith. The multiplier section is formed from a multiplier file 71, a multiplier 72 and a shift/select 74. The add/subtract section is fabricated from an adder/subtractor circuit 76, an A-input register 78 and a B-input register 80 with the output processed through a shift/select 82. The ALU section consists of an ALU file 84 and an ALU circuit 86.

The input ports A, B and C consist of sixteen-bit data buses, the A- and B-ports being selected for input and output functions and the C-port selected only as an input bus. The A-, B- and C-ports are selected as inputs to the A- and B-inputs of the multiplier file 71 by multiplexers 88 and 90, respectively. The multiplexer 88 selects inputs from the A-port and also the output of the ALU 86 and the output of the shift/select circuit 82 in the add/subtract section. The multiplexer 90 selects between the B- and C-input ports and also between the output of the ALU 86 and the output of the shift/select circuit 74 in the multiplier section. The inputs received from the multiplexers 88 and 90 are processed through the multiplier file 71 and the multiplier 72 operates thereon to process the results in the shift/select circuit 74 to perform the overall multiplication. The multiplication on a digital value can utilize many different algorithms, one of which is Booth's algorithm.

The output multiplexer 52 has the input thereof connected through the lines 48 to the output of the ALU 86 and to the output of the shift/select circuit 82. The inputs of the multiplexer 56 are connected through the lines 50 to the output of the ALU 86 and also to the output of the shift/select circuit 82. In operation, the data is loaded into the multiplier file and then the multiplication performed with the multiplier 72 and the shift/select circuit 74. One output of the shift/select circuit is input to a multiplexer 91 for selection and input to the A-register 78 of the add/subtract section. The other output of the shift/select circuit 74 is connected back to the input of the multiplexer 90. Additionally, the outputs of the multiplier file 71 are routed by the multiplier 72 and the shift/select circuit 74 for input to the multiplexer 91 and also to a multiplexer 93, the output of which is connected to the B-register 80.

The multiplexer 91 in the add/subtract section has four inputs which are connected to one output of the shift/select circuit 74, one output of the multiplier file 71, the A-input port and the output of the ALU 86. The multiplexer 93 has three inputs, one input thereof connected to the output of the shift/select circuit 74, one input thereof connected to one output of the multiplier file 71 and one output thereof connected to the output of the add/subtract circuit 76. In operation, the add/subtract circuit 76 receives two inputs from the A-register 78 and B-register 80, which have the input values thereof selected by the multiplexers 91 and 93, respectively. The output of the add/subtract circuit 76 is either input back to the multiplexer 93 for selection and subsequent storage in the B-register 80 or processed through the shift/select circuit 82 for output therefrom.

The output of the shift/select circuit 82 is input to both a multiplexer 92 and one input of a multiplexer 94. The outputs of the multiplexers 92 and 94 are connected to the inputs of the ALU file 84. The multiplexer 92 has the remaining inputs connected to the A-input port, the C-input port and the output of the ALU 86. The multiplexer 94 has the remaining inputs connected to the B-input port, the output of the shift/select circuit 74 of the multiplier section and the output of the ALU 86. In operation, the ALU 86 is controlled by microcode instructions from the register 66 to perform select logic operations on data that is selected for output by the multiplexers 92 and 94 and processed through the ALU file 84. The ALU file 84 is comprised of internal registers that store the selected data for selective output to the ALU 86 in response to microcode instructions. This data is then processed through the ALU 86 and output therefrom.

In testing the VALU 40, various portions thereof can be tested in addition to the operations of the various internal functional circuits. For example, if the operation of the multiplier file or various register files is to be checked, the test pattern generator or ROM 16 is addressed to output a prestored value for storage in the desired register or data file and then the internal functional blocks controlled to merely transfer the data therethrough to the output of the ALU 86 for input to the recognition circuit or comparator 20 to determine if the expected result has been received. The test pattern generator or ROM can be controlled to output any type of test pattern, and the various circuits such as the adder/subtractor 76 and the ALU 86 can have the logic functions thereof controlled to manipulate the data through the various files and registers in a predetermined manner. An error in any of the devices can provide a result that is different from the expected result, thereby indicating a defect in the overall device.

In an additional form of the test, as described above, a diagnostic program is stored in the microcode ROM 60. This program is utilized only for the self-test feature. It is a sequence of tests that is stepped through to perform various functions with the VALU 40 and compares the output results in the recognition circuit or comparator 20. Since this is a predetermined test, the test can either be designed to output various results or it can be designed to always output the same result such as a string of bits having a logic state of "0". This would be a simplified version wherein the recognition circuit or comparator 20 would always be comparing the result with a data word having a logic "0" for all of the data bits therein. By utilizing a diagnostic program, the particular test to be performed can be more closely controlled. However, this may prove to be a disadvantage in terms of the number of instructions required to run a complete test. Therefore, it is usually desirable to utilize other techniques that more efficiently utilize memory space on chips. This, of course, is a matter of design choice.

Ring Network

Referring now to FIG. 4, there is illustrated a schematic block diagram of a network of VLSI devices illustrating the interconnection of the interface port output terminals in a ring configuration. The VLSI devices are denoted by the reference numerals 96, 98, 100 and 102 and are referred to as "slave devices". Each of the slave devices 96-102 can perform various functions and these functions can be interrelated. However, each of the circuits can also perform completely independent functions which are not interrelated. The functional interconnects between the rest of the circuitry and the remainder of this system are illustrated by a signal bus 103. In the functional mode, data is carried between the devices 96-102 only on the signal bus 103, which can be any configuration of interconnects. In the test mode, the functional portion of the slave devices is isolated from the signal bus 103 such that the slave devices do not interact.

As described above, the interface circuit 30 for each of the slave devices 96-102 is comprised of four lines. There are two signal lines S1 and S2, a clock input line CK and an attention output AT for carrying error information. The signal lines S1 and S2 are bidirectional serial transmission lines that can either receive or transmit serial data. The interface circuit allows the slave devices 96-102 to be connected in a ring configuration and data received from or output to one of the signal lines S1 or S2. This data is in a serial format such that only one wire is required. Additionally, the interface circuit in each of the slave devices 96-102 can determine whether data is being received or transmitted on a given line S1 or S2 such that data can be input to either signal line port. As will be described hereinbelow, this has two advantages in that data can be transferred around the ring in any direction, and it is not important if the signal lines S1 and S2 are reversed.

The network for FIG. 4, as described above, is connected in a ring configuration with the slave device 96 being at one end of the ring and the slave device 102 being at the other end of the ring. The S1 port of the slave device 96 is connected to the S1 pin of an interface connector 104 through a line 106. The S1 port of slave device 98 is connected to the S2 port of the slave device 96 through an interconnect line 108. In a similar manner, the S1 port of the slave device 100 is connected to the S2 port of the slave device 98 through an interconnect line 110 and the S1 port of the slave device 102 is connected to the S2 port of the slave device 100 through an interconnect line 112. The S2 port of the slave device 102 is connected to the S2 pin of the interface connector 104 through an interconnect line 114. The AT port of each of the slave devices 96-102 are connected to a common node 116 and to the AT pin of the interface connector 104 through respective interconnect lines. The CK port of each of the devices 96-102 is connected to a common node 118 through respective interconnect lines which are in turn connected to the CK pin of the interface connector 104. To operate the network, the four pins of the interface connector 104 are connected to a test/maintenance controller 120. The controller 120 can either be an external processor which is utilized to separately test the devices or it can be an integral part of the system for controlling the self test and maintenance features of the slave devices 96-102 in accordance with the present invention.

The interface port of each of the slave devices 96-102, as utilized in the network of FIG. 4, allows for a number of different operations to be performed on the VLSI circuits. One mode, as described above, is the self-test feature wherein all of the slave devices are placed into a self-test mode to determine if any of the devices are defective or not. If any one of the devices in the network are defective, a signal is output on the AT node 116 to indicate a device failure. Since all of the devices are common to one network, one device failure will result in the failure of the entire network. However, a second or diagnostic mode allows for individual testing of each of the slave devices 96-102 in the network such that a determination can be made as to the particular part which must be replaced.

Testing of the slave devices in the self-test mode determines if the functional circuit block on the particular device is operational. However, this does not test the interfaces between the various devices on a given integral unit such as a board. To facilitate this type of a test, the diagnostic programs in the microcode ROM are designed such that a predetermined test is performed with signals output by other devices in a given network. For example, if no device failure is registered, signals from the test pattern generator or ROM on a particular device will be generated, processed through the associated functional circuit and transferred to the output pins of the device for reception and processing by another device. This, of course, requires interaction between the various diagnostic programs and constitutes a second level of testing. The diagnostic programs for this higher level are custom tailored for a given set of chips in a network. The transition from the first level of self-testing on the chip to the second level of interactive testing between various devices in a network could be automatic or it could be prompted from signals by the test/maintenance controller 120. If a failure is detected, this would be indicated on the AT node 116, thus registering a network failure wherein the interfaces between the various devices in a given network cause the failure, rather than the particular chips themselves. By performing this higher level test, additional modes of failure can be detected.

In addition to self-testing, each of the slave devices also possesses the capability of being selectively addressed by the controller 120 and receiving data from the control bus 32. This data can be in the form of instructions for the functional circuit operation, programming information or actual data to be input to the functional circuit and processed thereby. The selected slave device can also send a response back to the controller 120 along the control bus 32, as will be described hereinbelow.

Referring further to FIG. 4, the ring structure network facilitates data transmission from either end of the network to each of the slave devices in the network with each slave device in the network receiving the data and either absorbing the data or relaying it to the next slave device in the ring. This relayed data may be modified, as will be described hereinbelow, or passed directly through. With the use of the ring configuration in accordance with the present invention, the slave devices are selected as a function of their relative position on the ring. For example, if data is sent on pin S1 of the interface connector 104, the device 100 will be the third device on the ring. However, if the signal is sent on the S2 pin of the interface connector 104, the device 98 will occupy the third position. Therefore, it is necessary to know both the position of the slave device on the ring and the direction of signal transmission on the ring in order to distinguish a given one of the slave devices as the "selected" one. Once selected, an internal flag is set in the selected device and any data placed on the bus thereafter will be absorbed only by that device. The flag is reset when another device is selected.

Initially, all the devices are in an "idle" state awaiting instruction. A signal is placed on the bus with selection information coded therein. Each of the devices that receives this information must first determine which of the signal ports S1 or S2 has received the data. Once received, the data is examined to determine if the device is in the appropriate coded position on the ring. If not, the signal is modified and relayed to the device in the next position on the ring. This modification, as will be described hereinbelow, is a form of counting in which the device at the first position modifies the signal to decrease the coded number by one until the count is equal to zero. If, for example, the coded position were for the third device in the ring in a given direction of signal transmission, a value of two would be coded in the signal with the device at the first position modifying the signal to a value of one and the device at the second position modifying the signal to a value of zero. The device at the third position would recognize the zero value as a selection code and set the internal selection flag for that device. This device would then be ready to receive data regarding its operation relative to instructions received from the controller 120.

The ring structure of the network allows the controller 120 to communicate with a given device on the ring from either direction. This is essential in that a broken one of the interconnects does not impede communication with that device. It is only necessary to know the position of the device with respect to either end of the ring. In this manner, any of the devices can be tested when only one interconnect is open or, alternately, the interface circuit of any of the devices is inoperable, thereby inhibiting transmission of the data between the S1 and S2 ports thereof.

Interface Circuit

Figure 5:
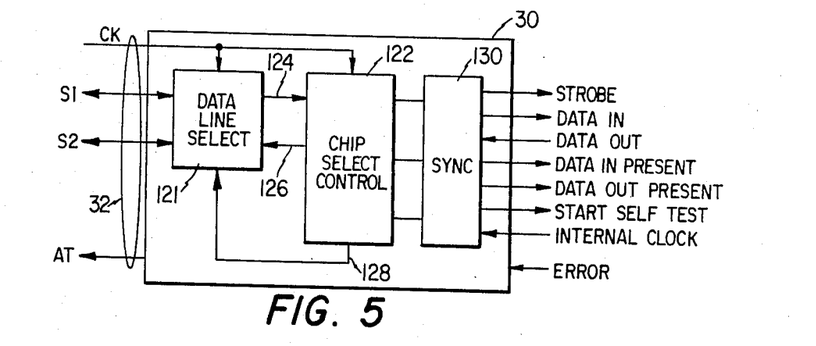
FIG. 5 illustrates a block diagram of the test port interface.

Referring now to FIG. 5, there is illustrated a schematic block diagram of the interface circuit 30 on each of the VLSI slave devices. As described above, the interface circuit 30 communicates with the ring structure through the control bus 32. The signal lines S1 and S2 transmit serial data and the CK signal transmits a clock signal that is independent of the internal clock of the slave device. This clock signal normally runs at a much lower frequency than the internal clock of the slave device to accommodate the long runs between the various devices in the network. Since the internal clocks of the devices may run at frequencies between 10 and 100 mHz, synchronizing the transmission of data on the S1 and S2 signal lines at this frequency would present numerous problems. Therefore, a separate clock is utilized and the transmission is asynchronous with respect to the internal clock.

The S1 and S2 signal lines are input to a data line circuit 121 which determines which of the data lines S1 or S2 is transmitting data. Data is received from only one of the lines but transmitted back along either of the lines. In one mode referred to as a "relay" mode, the data is received on one of the signal lines and transmitted out on the other of the two signal lines whereas in the "reply" mode, the data is sent back along the receiving one of the lines. The data line select circuit 121 allows for transfer of data on the signal lines independent of the connection thereof and the direction of travel.

Once the data line select circuit 121 has selected the signal line S1 or S2 that has data being transmitted thereon, the data is transferred to the chip select control 122 on a transfer data line 124. Data is transferred back from the chip select control circuit 122 on a data transfer line 126 to the data line select circuit 121. The data line select circuit 121 is controlled by the chip select control 122 through a control line 128 to both determine which of the lines S1 or S2 is the receiving one thereof and which line is to have data transferred thereon depending upon whether data is to be relayed or sent back to the controller 120.

The chip select circuit 122 examines the received data, interprets the information therein and then processes the data. The received data can contain three types of messages, a "Select" message, a "Global Self-Test" message and a "Last Selected Device" message. If the message is a Select message, adjacent bits are examined to determine if the coded select message pertains to the receiving device and, if not, the data is modified and relayed through the ring structure to the next adjacent slave device. If the coded select message selects the receiving device, the select flag is set and the message absorbed. When the message is a Global Self-Test message, the self-test mode is initiated and the message relayed. If the message is an LSD message, the select flag of the receiving device is examined and, if set, the data is absorbed; otherwise, the data is relayed through the ring structure to the next adjacent slave device.

The chip select control circuit 122 is interfaced with a synchronizing circuit 130 which provides an interface between the interface circuit 30 and the various inputs and outputs of the remaining portions of the chip. The synchronizing circuit 130 provides a number of outputs to control the interface between the chip select control circuit 122 and the remainder of the chip and also to provide the various commands and transfer data between the ring structure and the slave device.

In order to transfer data to and from the slave device, it is necessary to provide flags which are referred to as a DATA IN PRESENT and a DATA OUT PRESENT signal. The DATA IN PRESENT signal indicates that the chip is selected and it is ready to receive data, whereas the DATA OUT PRESENT signal indicates that data is contained within an internal register in the slave device for output on the S1 or S2 signal line. A DATA IN terminal is provided for receiving data from the chip select control circuit 122 and a DATA OUT terminal is provided for transmitting data from the internal registers of the slave device to the chip select control circuit 122 for transfer to the S1 or S2 lines. Additional signals are also provided. A START SELF-TEST signal is provided which, when activated, indicates that the self-test feature is to be initiated. Error information is provided by an ERROR signal which activates the AT line of the ring structure. An INTERNAL CLOCK signal is also provided to provide the synchronizing circuit 130 with a synchronizing reference.

Bit Protocol

Figure 6:
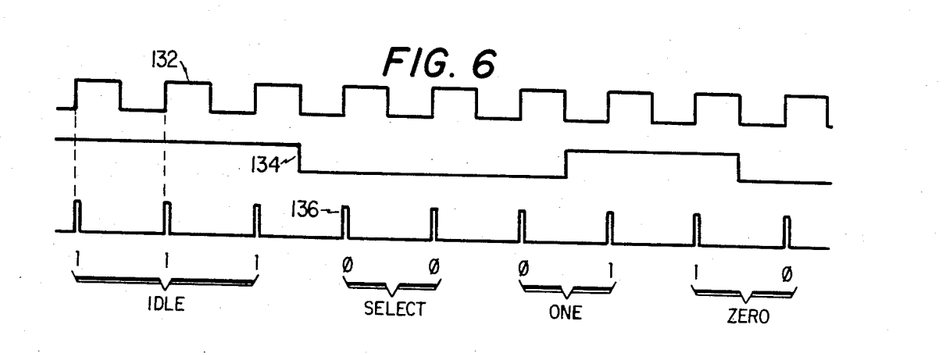
FIG. 6 illustrates waveforms for the bit protocol.

Referring now to FIG. 6, there is illustrated waveforms for the bit protocol of the serial data on the signal lines S1 and S2. A waveform 132 represents the clock signal CK that is transmitted to each of the slave devices on the ring network. The CK signal can have a frequency of approximately 1 MHz whereas the slave devices may have internal clock frequencies between 10 to 100 MHz or even higher. The format utilized for the serial transmission is referred to as "di-bit" data transmission. This form of transmission utilizes groups of two binary logic bits to define four states. The four states are "Idle", "Select", "One", and "Zero". The Idle di-bit state is defined by two adjacent Logic "1" bits, the Select di-bit state is defined by two adjacent Logic "0" bits, the One di-bit state is defined by a Logic "0" bit followed by a Logic "1" bit and a Zero di-bit state is defined by a Logic "1" bit followed by a Logic "0" bit.

A waveform 134 represents a typical sequence of di-bits. In order to obtain a reference, the Idle di-bit state is normally a sequence of Logic "1" bits and a frame of reference is determined when a transition to a Logic "0" bit occurs. This occurs when either a Select di-bit or a One di-bit occurs. The edge transition for the serial data occurs on a trailing edge of the CK signal and sampling of the logic state of the serial data stream waveform 134 is synchronized with the leading edges of the CK waveform 132. This is represented by sampling pulses in waveform 136. In the waveform 134, the first three samples correspond to three Logic "1" bits which represent the Idle di-bit state. When the waveform 134 makes a transition from the Idle state to a Logic "low" level, a reference point is provided for framing the di-bits. This, as described above, occurs when either a Select di-bit or a One di-bit occurs. In the waveform 134, the first two logic bits after the Idle di-bit state are at a Logic "0" level to define a Select di-bit. The next two logic bits are at a Logic "0" and a Logic "1" level to define a One di-bit. The next sequential bits are at a Logic "1" level followed by a Logic "0" level to define a Zero di-bit.

Messages are generated by the test/maintenance controller 120 with only one message being present at any given time. If a message requires a response from the selected slave device, then the test/maintenance controller 120 must wait for the response before sending another message. As described above, the test/maintenance controller 120 can send three types of messages. They are "Select", "Global Self-Test" and "Last Selected Device" (LSD) messages. The Select message contains address information in addition to a device specific command. The LSD message contains only a device specific command with the nearest LSD device being the implied address of that command. A Global Self-Test notifies all of the slave devices to enter the self-test mode.

The Select message begins with a select di-bit followed by an address field and then a device specific field containing the specific command. The address is comprised of n−1 Zero di-bits followed by a One di-bit. This address is for the n'th slave device in the ring structure. As will be described hereinbelow, each slave device in the ring structure modifies the address field by removing one of the Zero di-bits. The modified select message is then relayed to the next adjacent slave device in the ring structure. At the end of the select message, a series of Idle di-bits indicates the end of the message.

The LSD message is initiated with a One di-bit followed by a device specific field and then ending with Idle di-bits. As will be described hereinbelow, the LSD message is absorbed only by the active or selected device which had previously received a select message. When the select message is received, the selected device sets a select flag. Unless the select flag is set, the slave device relays the LSD message to the next adjacent slave device in the ring until the device having the select flag set is encountered. The selected device absorbs the data and does not relay it.

The Global Self-Test message consists of consecutive Select di-bits and ends with a series of Idle di-bits. A signal is generated in response to receiving the consecutive di-bits and a self-test is initiated. The Global Self-Test message is then relayed to the next adjacent slave device in the ring structure such that all of the devices in the ring structure receive the Global Self-Test message.

Slave Selection

To select a device, a Select di-bit is transmitted followed by n−1 Zero di-bits and a One di-bit, where n is the position of the selected device on the ring. Each slave device responds to the Select di-bit by examining the state immediately following the select di-bit. If the first di-bit is a Zero di-bit, the signal is relayed. However, if the di-bit directly following the Select di-bit is a One, the slave device recognizes this as a select control and sets the select flag for that slave device. When the di-bit directly following the Select di-bit is a Zero, the interface circuit 30 first modifies this signal before transmitting it to the next adjacent chip. This modification is in the form of removing one Zero di-bit in the string of Zero di-bits. For example, if the select state were followed by two Zero di-bits and a One di-bit, the slave device would recognize this as a nonselect code and would pass the code on. However, the signal would be modified such that the Select di-bit is followed by one Zero di-bit and then a One di-bit. The next slave device would recognize the select sequence as being nonselective and the sequence would be passed to the next adjacent device after modifying the code by removing the remaining Zero di-bit, such that the Select di-bit is directly followed by a One di-bit. The next adjacent chip, the third chip in the ring, recognizes this as a select signal. Therefore, the Select di-bit followed by two Zero di-bits and a One di-bit represents the selection of the third slave device in a ring. Depending upon the number of slave devices that must be bypassed before the desired slave device is reached, the number of zeros between the Select di-bit and the One di-bit can be adjusted.

After a given slave device has recognized a Select di-bit, a message follows that begins with a leading One di-bit. Once a device has been selected, it stays selected until it detects a select sequence for another device. The selected device may receive many messages that are separated by Idle di-bits. Usually, the leading One di-bit is followed by a command describing the desired action which may then be followed by data. Each slave device frames the command and data fields in accordance with predetermined patterns. Response data to be read onto the ring is always sent back when an idle state exists and this response data always returns in the opposite direction from that in which select sequences are transmitted.

Figure 7:
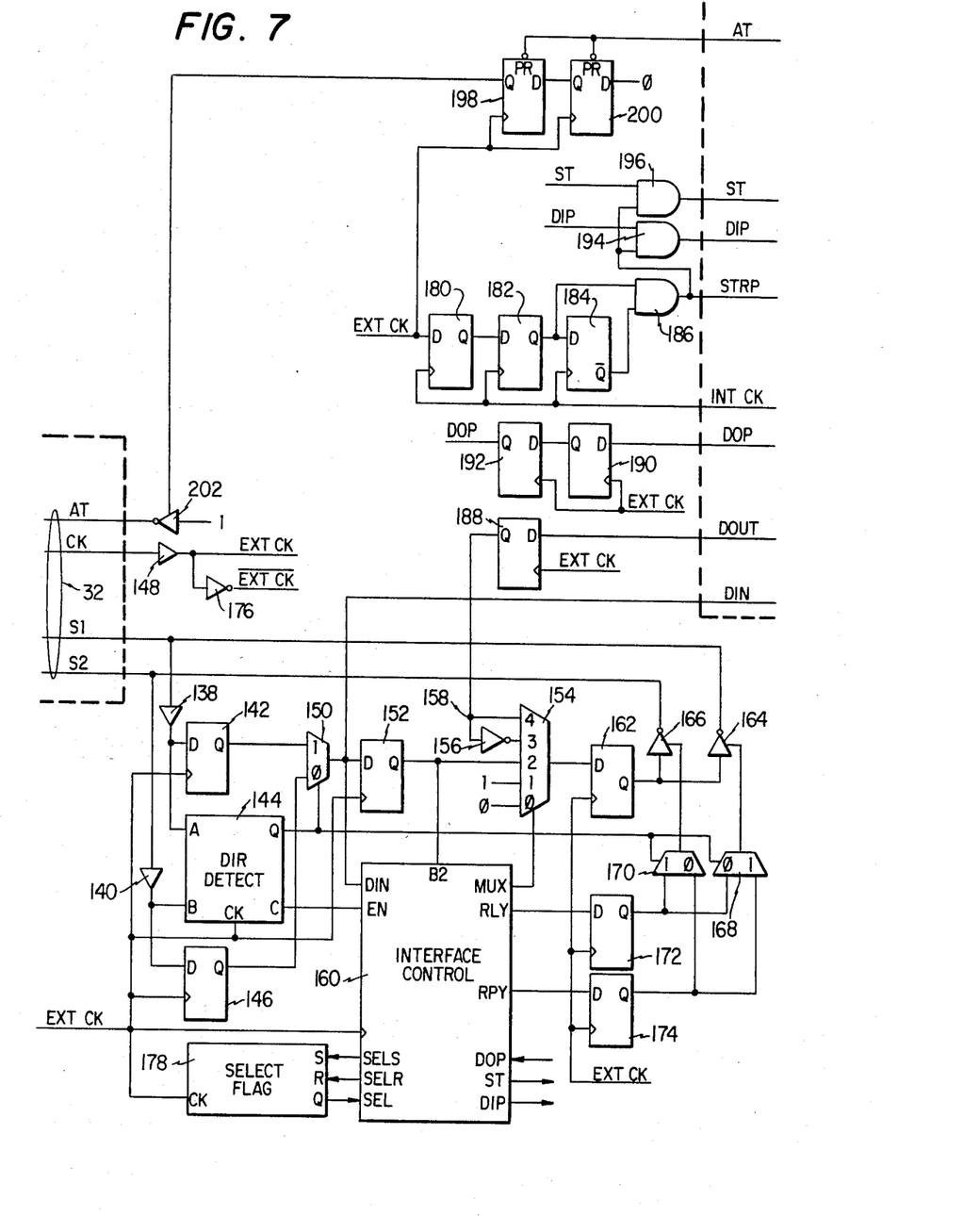
FIG. 7 illustrates a schematic diagram of the test port interface circuit.

Referring now to FIG. 7, there is illustrated a schematic diagram of the interface circuit of FIG. 5. The S1 and S2 signal lines of the control bus 32 are each connected to the input of a separate buffer 138 and 140, respectively. The output of the buffer 138 is connected to the D-input of a flip-flop 142 and also to the A-input of a direction detect circuit 144. The output of the buffer 140 is connected to the D-input of a flip-flop 146 and also to the B-input of the direction detect circuit 144. The clock inputs of the flip-flops 142 and 146 and the clock input of the direction detect circuit 144 are connected to the CK signal from the group of lines 32 through a noninverting buffer 148, the output of which is labeled EXT CK.

The Q-output of the flip-flop 142 is input to one input of a multiplexer 150 that is labeled "1". The Q-output of the flip-flop 146 is input to the other input of a multiplexer 150 that is labeled "0". The control input of the multiplexer 150 is connected to the Q-output of the direction detect circuit 144. The direction detect circuit 144 determines which of the signal lines S1 or S2 has incoming data thereon and, after making this determination, controls the multiplexer 150 to select the Q-output of the associated one of the flip-flops 142 and 146.

The output of the multiplexer 150 is input to the D-input of a flip-flop 152, the Q-output of which is connected to one input of a five input multiplexer 154 that is labeled "2". The clock input of the flip-flop 152 is connected to EXT CK. The multiplexer 154 has four remaining outputs labeled "0", "1", "3" and "4". The "0" input is connected to a logic "0" reference level and the "1" input is connected to a logic "1" reference level. The "3" input thereof is connected to the output of an inverting circuit 156 and the "4" input thereof is connected to a node 158, the node 158 being connected to the input of the inverter 156.

The multiplexer 154 has the multiplexer control input thereof connected to the MUX output of an interface control circuit 160. The interface control circuit 160 determines which of the multiplexer inputs is to be output therefrom. As will be described hereinbelow, the data output by the flip-flop 152 can either be passed directly through the multiplexer 154 or it can be replaced with a One di-bit or a Zero di-bit. Additionally, multiplexer 154 is utilized to select output data on the "3" and "4" inputs thereof.

The output of the multiplexer 154 is connected to the D-input of a flip-flop 162, the Q output of which is connected to the input of inverter circuits 164 and 166. The output of the inverter circuit 164 is connected to the S1 signal line and the output of the inverter circuit 166 is connected to the S2 signal line. The inverters 164 and 166 are tri-state gates which have control inputs connected to the outputs of a two input multiplexer 168 and a two input multiplexer 170, respectively. The inverters 164 and 166 either present a high impedance to the signal lines S1 and S2 or drive the lines with a logic low or high signal.

The two input multiplexers 168 and 170 each have an input labeled "1" and an input labeled "0". The "1" input of the multiplexer 170 and the "0" input of the multiplexer 168 are connected to the Q-output of a flip-flop 172 and the "0" input of the multiplexer 170 and the "1" input of the multiplexer 168 are connected to the Q-output of a flip-flop 174. The control inputs thereof are connected to the Q-output of the direction detect circuit 144.

The D-input of the flip-flop 172 is connected to an output of the interface control circuit 160 labeled RLY corresponding to a relay function and the D-input of the flip-flop 174 is connected to an output labeled RPY corresponding to a reply function. The flip-flops 172 and 174 are operable to control which of the signal lines S1 or S2 is to receive selected data from the mutliplexer 154. For example, data can be received on the S1 input, passed directly through the multiplexer 154 and output on the signal line S2. Conversely, data can be received on the signal line S2 and output on the signal line S1. Each of the flip-flops 162, 172 and 174 has the clock input thereof connected to the inverse of the EXT CK which is processed through an inverter 176.

The interface control circuit 160 examines the logic state of the data bits on both the input and the output of the flip-flop 152. The input of the flip-flop 152 is connected to a DIN input corresponding to input data bits and the output of the flip-flop 152 is connected to an input labeled "B2" corresponding to the second bit of data. By delaying the data for one cycle of the EXT CK clock signal, the interface control circuit can simultaneously look at two logic states of the stream of data. In this manner, it can determine if a Select di-bit is present. If a Select di-bit is determined by the presence of two consecutive logic "0" bits, transmission of data through the multiplexer 154 is inhibited. The interface control circuit 160 then examines the next consecutive logic bit to determine the logic state thereof. If the logic state indicates the presence of a One di-bit, on SELS output corresponding to a select set signal is raised to a logic high level. This output is input to the Set input of a select flag circuit 178 which has the output thereof input to the SEL input of the interface control circuit 160. Thereafter, the interface control circuit 160 will always have an indication as to whether it is the selected device on the ring regardless of the data being input to the device on the S1 or S2 signal line.

If the data immediately following the select state is a Zero di-bit state, the interface control circuit 160 recognizes that the select sequence is for another chip and it performs two functions. First, it generates an SELR signal output to the select flag circuit 178 to indicate a reset function which changes the state of the SEL signal to provide a future indication that this slave device is not selected and, second, the data stream is modified. This modification is in the form of deleting the Zero di-bit and replacing it with a Select di-bit. This replacement is effected by generating two sequential logic "0" data bits with the multiplexer 154. This newly generated Select di-bit is then transmitted through the flip-flop 162 followed by remaining di-bits in the selection sequence. The result is that one Zero di-bit has been deleted from the selection sequence.

When the select sequence is modified, it is output on the opposite signal line to that on which the data was received. This is a relay function which relays the data to the next slave device in the ring. The relay function is effected with the RLY output from the interface control circuit 160 being selected by the appropriate one of the multiplexers 168 and 170 to activate the driver 164 or 166 corresponding to the opposite signal line S1 or S2 as the output one thereof.

In addition to the Select sequence or Select message that is sent on the signal line S1 or S2 by the test- /maintenance controller 120, the controller 120 can also send a Global Self-Test Message and a Last Selected Device "LSD" message. The Global Self-Test message is a special message which directs all of the devices on the ring to perform a built-in self-test, as described above. The LSD message contains only a device specific command and the nearest LSD is the implied address. Although the test/maintenance controller 120 can send messages and initiate self-test, the slave devices can only send response messages. These response message are in the form of activating the AT line to indicate error information or a response message sent back along the ring structure, as will be described hereinbelow.

The LSD message is initiated with a One di-bit and then is followed by a device specific field containing the data. The message ends with the Idle state to indicate the end of the message data. When the message is placed onto the bus, all of the devices that are interspersed within the ring prior to the selected device have the select flag circuit 178 set such that nonselected devices will have the relay output RLY activated to relay the data through the nonselected devices to the next adjacent slave device. This will continue until the selected device receives the data, the selected device being that which has the select flag set by the circuit 178.

The Global Self-Test Message consists of consecutive Select di-bits and ends with a precharged signal which is an Idle di-bit or a series of logic "1" levels. The response message from a slave device is a message that logically follows a previous Select or LSD message. The response message is identical to the LSD message in terms of format except that the destination is the test/maintenance controller 120. In this mode, the reply output RPY of the interface control circuit 160 is activated to output a signal to the "0" input of the multiplexer 170 and the "1" input of the multiplexer 168. It is important to return the response of the slave device along the same path on which the data was received since there is a possibility that a slave device having a higher position on the ring may be defective. The fact that data was received by the selected slave device implies that the communication path is intact with a very low probability that the direction detect circuits on the intermediate slave devices are defective, thus allowing bidirectional transmission through the intermediate slave devices back to the controller 120.

The AT line can operate in two modes for error recognition. In the first mode, the AT line remains at at a logic low level and is only pulled to a logic high level if one of the above devices fails. In the second and preferred mode, the AT line is pulled to a logic high level when the self-test is initiated, with each of the slave devices capable of maintaining the AT line at the logic high level. After the self-test is completed for a given slave device, the AT line is "released" and the AT line can only remain at a logic high level if one or more of the slave devices does not release the AT line. In this manner, the test controller 120 need only monitor the AT line to determine when and if the self-test is complete. If the AT line remains at a logic high level, an error is indicated. Although the specific device that registers this error is not known, the system is inoperable and must be repaired. In the maintenance mode, each slave device can be independently addressed and controlled to perform a self-test such that the defective device can be determined.

In order to interface with the remaining portions of the chip, additional circuitry is required for initiating the self-test, transferring data thereto, transferring data therefrom and receiving error information. In order to synchronize these operations, a strobe signal STRB must be generated. The strobe signal is generated from the clock signal EXT CK, which is input to three flip flops 180, 182 and 184, all of which are clocked by the internal clock of the chip labeled INT CK. The Q-output of the flip-flop 180 is connected to the D-input of the flip-flop 182 and the Q-output of the flip-flop 182 is connected to the D-input of the flip-flop 184. The Q-output of a flip-flop 182 and the Q-output of the flip-flop 184 are connected to the inputs of an AND gate 186 which generates the STRB signal on the output thereof. Since the INT CK signal is at a much higher rate than the EXT CK signal, the Q-output of the flip-flop 182 will be at a logic high level for a sufficient amount of time to clock this level through to the inverted Q-output of the flip-flop 184. At this time, the STRB signal goes to a logic high level and remains there for one clock period of the INT CK and then goes to a logic low level. This in effect provides a pulse that is synchronized with the clock edge of the INT CK signal.

Once a synchronized strobe signal is derived from the slower EXT CK signal, other functions such as outputting and inputting data can be performed. To input data, the data is input on a data-in line DIN and to output data, the data is output on a DOUT output line. The DIN input is connected to the output of the multiplexer 150 to receive input data therefrom. The DOUT output is connected to the D-input of a flip-flop 188, the Q-output of which is connected to the node 158 and is clocked by the EXT CK signal.

The interface control circuit 160 controls the selection output data and also the output data that is sent back to the controller 120 as a reply. This operation is synchronized with the use of data input present signal "DIP" and data output present signal "DOP". The DOP signal is an output from the remainder of the chip and is processed through to serially connected flip-flops 190 and 192. The DIP signal is generated by the interface control circuit 160 and is synchronized with the remainder of the chip by an AND gate 194, which has one input thereof connected to the DIP output of the interface control circuit 160 and the other input thereof connected to the STRB signal. As described above, the DIP and DOP signals are "true" only when the device has been selected and the data strobe is active.

In order to synchronize the operation of the self-test feature, an ST signal is generated by the interface control circuit corresponding to the start signal for the self-test feature. The signal is input to one input of an AND gate 196, the other input of which is connected to the STRB signal. This signal is raised to a logic high level when the Global Self-Test message is received. For error message information, the AT signal is output by the chip for input to the present inputs of two serially connected flip-flops 198 and 200, both of which are clocked by the EXT CK signal. The Q-output of the output one of the flip-flops 198 and 200 is connected to the gate control of an inverter gate 202. The input of the inverter gate 202 is connected to a logic "1" level and the output thereof is connected to the AT signal line of the lines 32. The D-input of the input one of the flip-flops 198 and 200 is connected to a logic "0" level. In operation, the AT line is used to report a self-test failure in a number of ways. First, the AT signal is active during the test and is released if the test is successful; that is, all of the AT outputs from the slave devices are set to an active state during tests and when the test is over, the chip generates an AT signal which is relayed through the flip-flops 198 and 200 to release the active state on the AT signal line on the output lines 32. Alternately, the AT signal can be activated only if the test fails. If the mode is utilized wherein the device failure results in the failed device maintaining the AT signal active, the test/maintenance controller 120 can then poll the devices on the ring structure until one of the devices is forced to deactivate or release the AT signal. This allows the test/maintenance controller 120 to determine which of the slave devices around the ring structure has failed.

Figure 8:
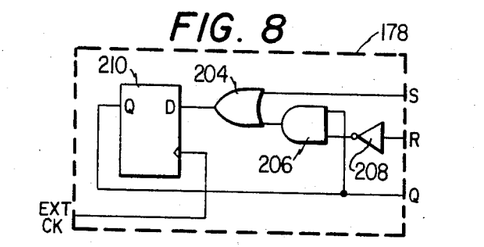
FIG. 8 illustrates a schematic diagram of the select flag circuitry.

Referring now to FIG. 8, there is illustrated a schematic block diagram of the select flag circuit 178. The select flag 178 has the select input thereof connected to one input of an OR gate 204, the other input of which is connected to the output of an AND gate 206. The AND gate 206 has one input thereof connected to the Q-output of the select flag 178 and the other input thereof connected to the reset input through an inverter 208. The output of the OR gate 204 is connected to the D-input of a flip-flop 210, the Q-output of which is connected to the Q-output of the select flag 178. The flip-flop 210 is clocked by the EXT CK signal. In operation, the SELS signal on the Set input of a select flag 178 is clocked through the flip-flop 210, whereas the SELR signal on the reset input thereof changes the state only if the prior state had a logic high level on the Q-output thereof.

Figure 9:
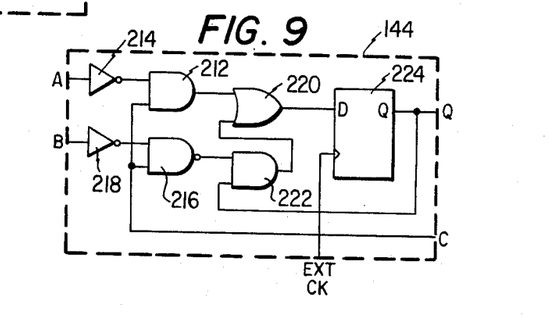
FIG. 9 illustrates a schematic diagram of the direction detect circuit.

Referring now to FIG. 9, there is illustrated a schematic diagram of the direction detect circuit 144. The A-input of circuit 144 is input to one input of an AND gate 212 through an inverter 214. The B-input of the circuit 144 is input to one input of a NAND gate 216 through an inverter 218. The other input of the AND gate 212 and the NAND gate 216 is connected to the C-input of the circuit 144. The output of the AND gate 212 is connected to one input of an OR gate 220, the other input of which is connected to the output of an AND gate 222. The output of the OR gate 220 is connected to the D-input of a flip-flop 224. The AND gate 222 has one input thereof connected to the output of the NAND gate 216 and the other input thereof connected to the Q-output of the flip-flop 224. The Q-output of the flip-flop 224 corresponds to the Q-output of the direction detect circuit 144. The flip-flop 224 is clocked by the EXT CK signal. In operation, a signal on the A-input of the direction detect circuit 144, in addition to the ENABLE signal, causes the data to be passed through the flip-flop 224. Alternately, the data input on the B-input results in inverted data output by the NAND gate 216 when the ENABLE signal is generated and this in turn drives one input of the AND gate 222. The AND gate 222 generates an output only when an output on the Q-output of the flip-flop 224 is present.

Figure 10:
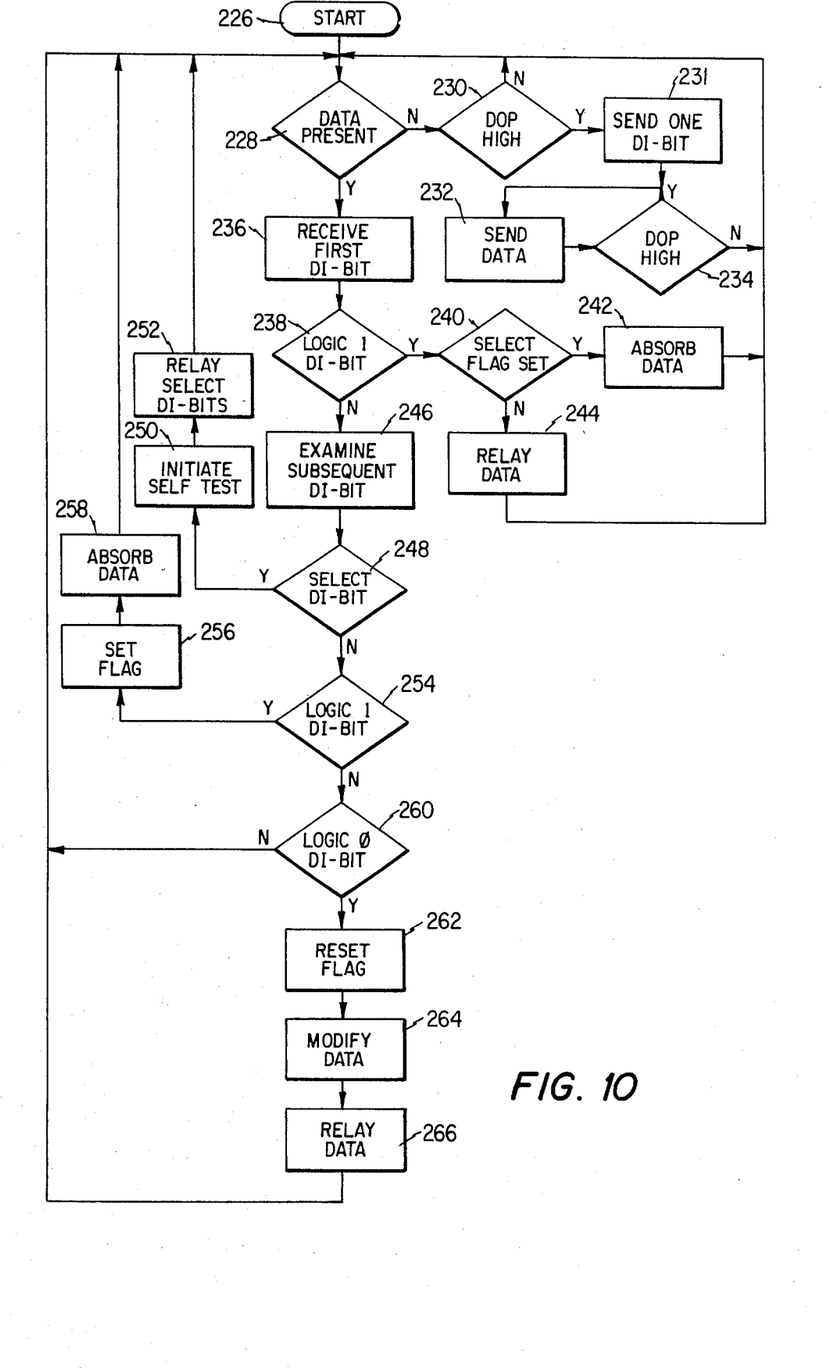
FIG. 10 illustrates a flow chart of the operation of the interface circuit and the self-test feature of the VLSI chip.

Referring now to FIG. 10, there is illustrated a flow chart for the operation of the interface circuit 30 and the interface control circuit 160 in the interface circuit 30. The sequence is initiated at a start block 226 and proceeds to a decision block 228 to determine if data is present. As described above, the signal lines S1 and S2 are held at a high logic level until data is transmitted. Sensing of a logic low level indicates the initiation of data transmission. If a logic low level is detected, the program flows along the "Y" path and, if no logic low level is detected, the program flows along the "N" path to a decision block 230. The decision block 230 determines if the data out present signal DOP is high, indicating that data is stored in the chip and that the chip has been requested by a previous message to send back this data.

If the DOP signal is not high, the program proceeds along the "N" path back to the input of the decision block 228. If the DOP signal is high, the program flows along the "Y" path to a function block 231 wherein a One di-bit is transmitted back to the test controller to indicate the initiation of a response message. In this mode, the output drivers 164 and 166 are set to select the receiving one of the signal lines S1 and S2. The program then flows to a function block 232 to send data back to the test/maintenance controller 120 along the same path on which data was received. The program then proceeds to a decision block 234 to determine if the DOP signal is still high. As long as data is still contained within the device, the DOP signal will be maintained at a high logic level. When data transmission is completed, the DOP signal goes low. Therefore, the program flows along the "N" path back to the input of the Send Data function block 232 until all data has been transmitted, at which time it returns to the input of the decision block 228.

If data is present at the decision block 228, the program flows along the "Y" path to the input of a function block 236 to receive the second bit of the di-bit on the output of the flip-flop 152. The program then flows to a decision block 238 to determine if the received di-bit is a One di-bit. If the di-bit is a One, this indicates the presence of the message. The program in this mode flows along the "Y" path to a decision block 240 to determine if the select flag is set. If the select flag is set, this indicates that the device is selected and the program flows along the "Y" path thereof to a function block 242 to absorb the data. The program then flows back to determine if more data is present. If the select flag was not set, the program flows along the "N" path from the decision block 240 to a function block 244 to relay the data to the next slave device in the ring structure. The program then returns to the input of the decision block 228 to determine if more data is present.

If the second bit is determined in the decision block 238 to be a logic "0" indicating a Select di-bit, the program proceeds along the "N" path to a function block 246 to examine subsequent di-bits. The program then flows to a decision block 248 to determine if the subsequent di-bit is a Select di-bit. If it is a Select di-bit, this indicates the initiation of a self-test and the program flows along the "Y" path to a function block 250 to initiate the self-test. After initiation of the self-test, the program flows to a function block 252 to relay subsequent Select di-bits to the next slave device in the ring. The message indicating self-test initiation is the Global Self-Test message and is comprised of a string of Select di-bits. Since, as described above, the first Select di-bit is deleted after recognition thereof, a subsequent Select di-bit indicates both self-test initiation and also a relay function to relay the remaining Select di-bits to adjacent slave devices. There only needs to be a sufficient number of Select di-bits in the sequence to exceed the number deleted by processing through all the slave devices. The program then flows back to the input of the decision block 228 to await further data.

If the subsequent di-bit is not a Select di-bit, the program flows along the "N" path from the decision block 248 to the input of a decision block 254 to determine if the di-bit is a One. If it is a One di-bit, this indicates that the device has been selected and the program flows along the "Y" path to a function block 256 to set the select flag and then to a function block 258 to absorb subsequent data. After absorption of data, the program flows back to the input of the decision block 228 to await new data.

If the subsequent bit is not a One di-bit, the program flows from the decision block 254 along the "N" path thereof to the input of a decision block 260 to determine if the subsequent di-bit is a Zero. If the subsequent di-bit is not a Zero, this indicates the Idle state and the program flows back to the input of the decision block 228. However, if the di-bit is a Zero, the program flows to a function block 262 to reset the flag since a Zero di-bit following a Select di-bit indicates a select sequence wherein the present chip is not the selected chip. Therefore, the select flag must be reset and then the program flows to a function block 264. In the function block 264, the data is modified as described above by examining the list immediately following the Select di-bit and determining whether the bit is a logic "1" indicating a Zero di-bit or a logic "0" indicating a One di-bit. Since a Zero di-bit immediately follows the Select di-bit, it is altered to a Select di-bit and then the modified data stream relayed to the next adjacent slave device in the ring, as indicated by the function block 266. After relay of this modified data, the program returns to the input of the decision block 228 to await further data or select sequences.

In summary, there has been provided a fully self-testing VLSI device which combines a pattern generator and a recognition circuit with a functional circuit block in an integral device. A control circuit is also provided which controls the operation of the pattern generator to input predetermined patterns to the functional circuit block to elicit predetermined responses therefrom for output to the recognition circuit. The recognition circuit compares the output data with predetermined results. If the data output by the functional circuit in response to the input test pattern does not provide a true comparison with the expected results, the device is determined to be a failure and a signal is output on a dedicated terminal indicating such. A separate terminal is dedicated to a control signal to begin the self-test function, thereby requiring a minimum of two pins to initiate the self-test of the integral device and relay results of that test back to an external device.

In addition to the self-test feature, the test controller that is integral with the functional circuit block also interfaces with an external maintenance device to control the operation of the functional circuit block to test individual components thereof. Data can be received from the external device and specific functions performed with the functional circuit block and data output therefrom to the external device.

Each of the integral devices with the self-test feature can be assembled in a ring structure wherein each of the devices has an input port and an output port. Data is input to one of the ports with the other ports serving as the output port for attachment to the input port of an adjacent device, thus providing the ring structure. The data paths are formatted for serial transmission. When data is input to a particular device, the data is delayed such that two adjacent bits can be examined and, in response to the information contained therein, the data either relayed to the next adjacent device or modified and then relayed. This modification allows for selection of a particular device by its position on the ring structure. If the device is not selected, it counts down the precode select number until the count is equal to zero, indicating a selected device.

Although the preferred embodiment has been described in detail, it should be understood that various changes, substitutions and alterations can be made therein without departing from the spirit and scope of the invention as defined by the appended claims.

What is claimed is:

1. A communication network, comprising:
   a common transmission line having two ends and configured as a ring;
   a master control unit for being connected to both ends of said ring and having means associated therewith for originating transmission from either end of said ring and receiving transmissions from either end thereof; and
   a plurality of slave devices disposed about said ring at predetermined relative positions and in series with said transmission line, each of said slave devices having:
   means for determining the direction of transmission on said ring;
   means for delaying said transmission therethrough for a predetermined delay time;
   means for detecting a unique identifier in said transmission, said unique identifier generated by said master control unit and corresponding to the relative position of the receiving one of said slave devices on said ring relative to the end of said transmission line where said transmissions are originated, and
   means for inhibiting transmission of received data and terminating said ring when said unique identifier corresponds to the receiving one of said slave devices such that a communication link is established between the selected one of said slave devices and said master control unit, the selected one of said slave devices maintaining a termination on said ring until another unique identifier is transmitted from said master control unit.

2. The communication network of claim 1 wherein said transmission line is a serial transmission for transmitting serial data thereon.

3. The communication network of claim 1 wherein said unique identifier comprises a count signal having a predetermined count when transmitted by said master control unit and each of said slave devices further comprises means for modifying the count value by a count of one when the count value is not equal to zero, a count value of zero being recognized as a select code for the receiving one of the slave devices such that a count value of n-1 is required for selecting the nth one of said slave devices on the ring relative to the point of transmission from said master control unit.

4. The communication network of claim 1 wherein said transmission line is a serial transmission line for transmission of serial data thereon, said serial data being encoded in a di-bit format.

5. The communication network of claim 1 wherein said master control unit further comprises means for transmitting a request for data from the selected one of said slave devices, said requesting means inhibiting said master control unit from transmitting data on said ring until data is transmitted from the selected one of said slave devices.

6. The communication network of claim 5 wherein the selected one of said slave devices transmits data in the opposite direction from which data was transmitted by said master control unit.

7. The communication network of claim 1 wherein said transmission on said ring is asynchronous relative two internal functions of said slave devices, said master control unit further comprising means for generating an independent clock and each of said slave devices further comprising means for synchronizing the functional operation thereof with said generated clock from said master control unit.

8. The communication network of claim 1 wherein said transmission line is a serial transmission line for transmitting serial data thereon and each of said slave devices has two bidirectional inputs to allow said slave devices to be inserted in series with said ring, each of said inputs interfaced with an adjacent one of said slave devices or with said master controller through said ring, said serial inputs interchangeable.

9. A communication network, comprising:
 a master control unit having two bidirectional ports, each transmitting or receiving data;
 a plurality of slave units each being functionally independent and having two bidirectional ports, each transmitting or receiving data;
 transmission means for interconnecting in series said slave units and said master control unit in a ring configuration such that each of said slave units has each of the ports thereof in communication with either one of the ports of an adjacent one of said slave units or one of the ports of said master control unit;
 each of said slave units having:
  means for detecting transmission data on one of said inputs;
  means for delaying said data for a predetermined delay period and retransmitting said delay data from the opposite one of said ports from the receiving one thereof;
  means for monitoring said data after receiption thereof and prior to retransmission;
  means for recognizing a selection code, said selection code transmitted by said master control unit from a predetermined one of said master control unit ports and having a predetermined count encoded therein;
  means for modifying said selection code by decrementing said predetermined count by one if said predetermined count is not equal to zero, said modified selection code retransmitted to the adjacent one of said slave devices; and
  means for inhibiting retransmission of data when said count is equal to zero and establishing a communication link between said selected slave unit and said master unit for transmission of data therebetween.

10. The communication network of claim 9 herein said transmission means comprises a plurality of serial transmission lines for carrying serial transmission data, each of said transmission lines connected between adjacent ones of said slave units or between one of said master unit ports and one of said slave unit ports.

11. The communication network of claim 10 wherein said serial data transmission is encoded into a di-bit format.

12. The communication newtork of claim 9 wherein said master control unit comprises means for generating a clock having a frequency independent of the functional operation of said slave units, said clock interfaced with each of said slave units, each of said slave units further comprising means for synchronizing the internal functions thereof with said clock such that interface between said slave units and said ring structure under the control of said master unit can operate at a lower frequency.

13. The communication network of claim 9 wherein said inhibiting means is deactivated when another selection code is sensed wherein said predetermined count is not equal to zero.

14. The communication network of claim 9 wherein said selective slave unit is operable to receive a signal from said master control unit indicating a request to send data wherein said master control unit allows said selected slave unit to have control of said ring network to transmit data thereon, said master control unit relinquishing control of said ring network until data has been transmitted by said selected slave unit, said data transmitted back along the path from which said selection code was received by said selected slave unit.

15. A method for communicating between a master control unit and a plurality of slave units, comprising:
 disposing a plurality of slave units in series with a transmission line, the transmission line having two ends for bidirectional transmission of data with each of the slave units having a defined relative position on the transmission line;
 placing the master control unit in communication with both ends of the transmission line for transmitting and receiving data on both ends thereof to form a ring network;
 detecting the direction of transmission in each slave unit;
 delaying the transmission on the transmission line at each slave unit for a predetermined delay and retransmitting said delayed transmission in the same direction on the transmission lines;
 monitoring the data after reception at each slave unit prior to retransmission;
 recognizing a selection code, the selection code transmitted by the master control unit from a predetermined end above the transmission line, the selection code having a predetermined count encoded therein;
 modifying the selection code when the code is not equal to zero by decrementing the predetermined count by one, the modified selection code retransmitted to the next adjacent slave unit; and
 inhibiting transmission of data from a slave unit when the predetermined count is equal to zero indicating the selection of the slave unit and establishing a communication link between the selected slave unit and the master control unit for transmission of data therebetween.

16. The method of claim 15 wherein the transmission line is a serial transmission line for transmitting serial data.

17. The method of claim 15 wherein the transmissions are coded in a di-bit format.

18. The method of claim 15 and further comprising generating an independent clock at the master control unit, each of the slave units operating independent of each other and the master control unit and synchronizing the other interface of each of the slave units with the clock of the master control unit such that the clock can operate at a lower frequency than the functional operation of each of the slave units.

* * * * *